United States Patent [19]
Krohm et al.

[11] Patent Number: 5,351,526
[45] Date of Patent: Oct. 4, 1994

[54] APPARATUS FOR MONITORING LEAKAGE INTO EXHAUST LINES

[75] Inventors: Harald Krohm, Bochum; Ludger Holscher, Ludenscheid, both of Fed. Rep. of Germany

[73] Assignee: AFT Atlas Fahrzeugtechnik GmbH, Werdohl, Fed. Rep. of Germany

[21] Appl. No.: 75,763

[22] Filed: Jun. 11, 1993

[30] Foreign Application Priority Data

Jun. 13, 1992 [DE] Fed. Rep. of Germany ....... 4219453

[51] Int. Cl.$^5$ .............................................. G01M 3/04
[52] U.S. Cl. ........................................... 73/40; 73/46; 73/49.7; 73/118.1
[58] Field of Search ................... 340/438, 605; 73/116, 73/118.1, 117.3, 23.32, 40.5 R, 40.7, 46, 47, 49.1, 49.7, 49.8, 40

[56] References Cited
U.S. PATENT DOCUMENTS

| | | | |
|---|---|---|---|
| 3,998,095 | 12/1976 | Tinkham et al. | 73/49.7 |
| 4,819,602 | 4/1989 | Mieno et al. | 123/479 |
| 5,251,604 | 10/1993 | Kaneko et al. | 123/688 |

FOREIGN PATENT DOCUMENTS 714332 7/1965 Canada .............................. 73/49.7
4019572A1 6/1990 Fed. Rep. of Germany .

OTHER PUBLICATIONS

Computerized Engine Controls; Dick H. King; Glendale Community College; Ch. 6, pp. 181–191; 1987.
Methods of On-Board Misfire Detection; G. Plapp, M. Klenk, and W. Moser; SAE Paper 900232 (1990).

Primary Examiner—Robert Raevis
Attorney, Agent, or Firm—Darby & Darby

[57] ABSTRACT

Apparatus for monitoring suction leakage of external air into the exhaust gas path of an internal combustion engine during intermittent reduced pressure phases of engine running, includes two oxygen concentration sensing lambda probes arranged at a distance from one another along the path. The probes issue signals indicative of such oxygen concentration which are fed to a control device, such that an error signal is generated on deviation of the two probe signals from one another as caused by suction entry of external air into the path solely during a reduced pressure phase.

6 Claims, 1 Drawing Sheet

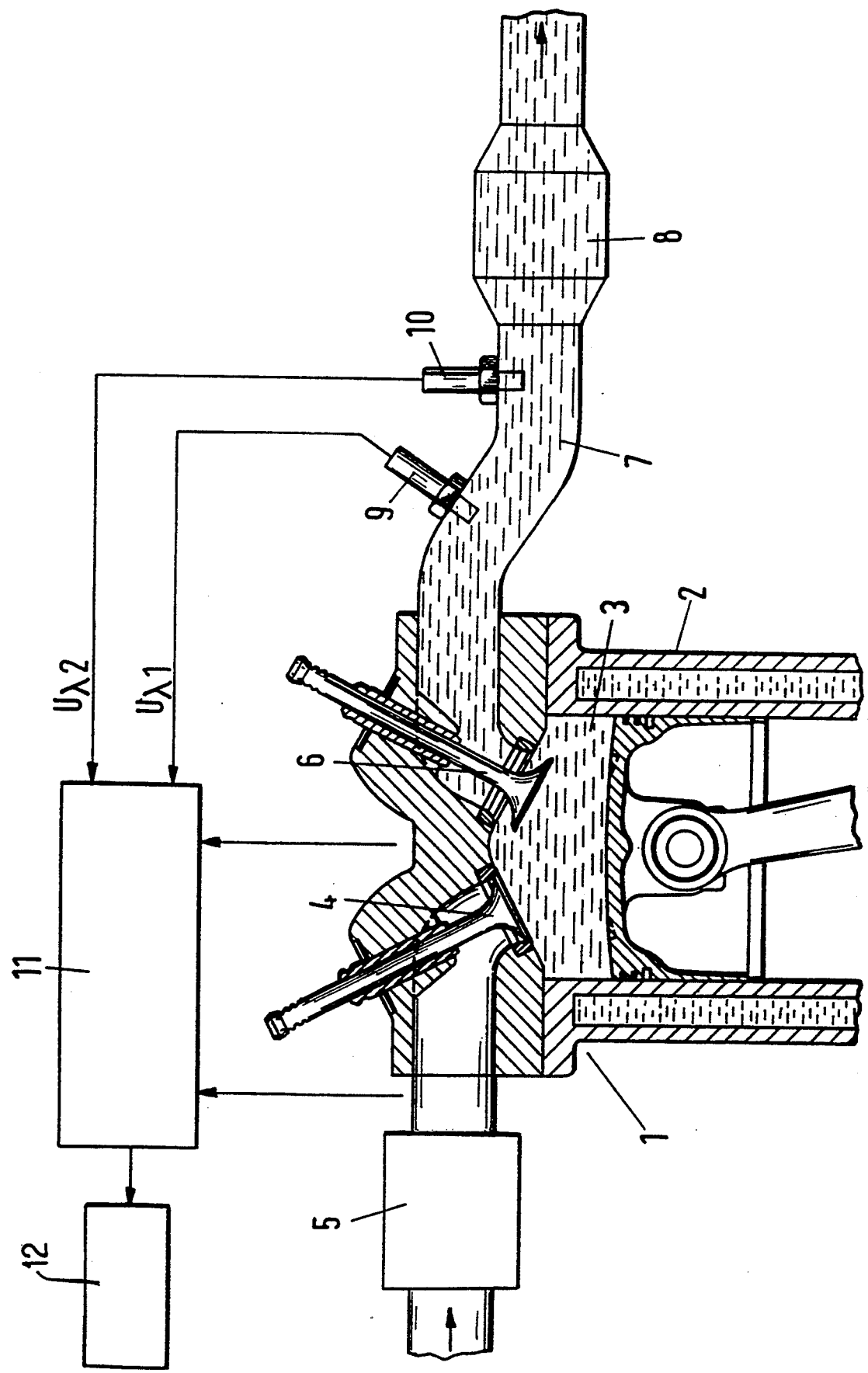

APPARATUS FOR MONITORING LEAKAGE INTO EXHAUST LINES

CROSS REFERENCE TO RELATED APPLICATION

This application discloses and claims subject matter related to that of copending U.S. application Ser. No. 08/075,760 filed simultaneously herewith, of overlapping inventorship herewith, entitled SYSTEM FOR MONITORING LEAKAGE INTO EXHAUST LINES, now pending.

FIELD AND BACKGROUND OF THE INVENTION

The present invention relates to an apparatus for monitoring leakage into the exhaust gas line or path of an internal combustion engine having oxygen concentration sensing and signaling means such as a lambda probe in the path for controlling the ratio of the air/fuel mixture fed to the engine.

Lambda probes are conventionally located in the exhaust gas path of internal combustion engines to measure the oxygen concentration in the exhaust gas for accordingly determining by feedback technique the proper ratio of the air/fuel mixture to be fed to the engine. The output signal of the lambda probe has a step at an air/fuel mixture ratio of 1, so that the engine can be regulated to operate with an air/fuel ratio of about such value. In normal operation, the lambda probe output signal contains control oscillations of around 10 Hz, i.e. constituting the so-called lambda control frequency of the output signal.

By way of such lambda probe feedback technique, the formation of the air/fuel mixture fed to an engine intake valve can be controlled to achieve optimum combustion in the associated cylinder and optimum cleaning of the resulting exhaust gas in a conventional three way catalytic converter located in the exhaust gas path downstream from the associated exhaust valve.

A three way catalytic converter is normally used in the internal combustion engine exhaust line of a motor vehicle to make sure that the exhaust gas vented to the atmosphere meets governmental regulatory emission standards for hydrocarbons (HC), carbon monoxide (CO) and nitrogen oxides ($NO_x$), e.g. in terms of maximum permitted emission concentrations (g/km or g/mi) of these three pollutants. This type catalytic converter typically uses a reducing catalyst to reduce nitrogen oxides in combination with an oxidation catalyst for overall three way emission control of hydrocarbons, carbon monoxide and nitrogen oxides.

It is only possible to achieve effective catalytic control of these three pollutants when the exhaust gas contains a very small amount of oxygen. This means that the ratio of the air/fuel mixture fed to the engine combustion chambers must be precisely controlled, with a view to maintaining it very close to an ideal stoichiometric combustion ratio. For this purpose, the exhaust gas composition is sensed and the carburetor or like device is adjusted in dependence on the composition via feedback control.

Since the exhaust gas is at a temperature too low for further reaction, treatment in a three way catalytic converter is necessary. However, an increased level of oxygen in the exhaust gas decreases the ability of the catalytic converter to treat the three stated pollutants in the desired manner. This adverse situation is aggravated when the exhaust gas path is subject to suction leakage of atmospheric pressure external air into the exhaust path as can occur during intermittent reduced pressure phases in the engine during operation. Generally, each combustion cycle of an internal combustion engine occurs several thousand times per minute, e.g. in an engine of the type used in gasoline fueled motor vehicles.

A requirement for the effectiveness of this arrangement is that the exhaust gas path be sealed against leakage, i.e. avoid any lack of proper sealing, as otherwise the exhaust gas cannot reach the three way catalytic converter in desired unchanged condition for proper catalytic cleaning before venting to the atmosphere. Internal combustion engine exhaust path sealing failures become evident particularly during reduced pressure phases in the engine operation, which are generated under certain operating conditions by a characteristic intermittent mode of internal combustion engine operation leading to pulsations. As a result of these pulsations, during a reduced pressure phase, comparatively high oxygen containing atmospheric pressure exterior air can penetrate into the engine exhaust gas path by suction leakage action at a sealing failure site.

It is desirable to provide means for detecting lack of sealing of the internal combustion engine's exhaust gas path, and particularly suction leakage of external air into such path.

SUMMARY OF THE INVENTION

It is an object of the invention to overcome prior art drawbacks and to provide means for detecting sealing failures in the internal combustion engine exhaust gas line or path, leading to suction leakage of external air into the path during running of the engine, such as by arranging at least two oxygen concentration sensing and signaling lambda probes at a distance from one another in the path, for feeding their signals to a control device arranged to generate an error signal solely in the case where the signals from the probes differ from one another by more than a certain amount, and where the difference arises solely on the basis of an increase in probe-detected oxygen concentration.

The comparison of the signals from the lambda probes takes place at a time corresponding to the reduced pressure phases of the engine characteristic.

In this connection, the term "reduced pressure phases of the engine characteristic" denotes those operating conditions of the engine in which, at least at some point in time and at least in locally limited manner, wherein the pressure in the exhaust gas path drops below atmospheric pressure.

The present invention is distinguished from the state of the art in that the difference between the measurement signals of the two lambda probes contemplated herein indicates a differing oxygen concentration at the spaced apart positions of the probes along the exhaust gas path. This provides an indication of a sealing failure in the path, from which an error signal can be derived, e.g. either as a diagnostic signal or an alarm signal. Thus, the invention makes possible a novel desirable self-diagnosis of the arrangement.

An essentially complete monitoring of the exhaust gas path is accordingly possible by arranging a first lambda probe as close as possible to, i.e. immediately after, a given engine exhaust valve and a second lambda probe as close as possible to, i.e. immediately before, the three way catalytic converter.

According to the invention, an improvement is provided in a monitoring apparatus for monitoring a ratio of an air/fuel mixture of an operating internal combustion engine having an exhaust gas path and including intermittent reduced pressure operating phases of the engine in which the path undergoes periods of reduced pressure relative to the atmospheric pressure of external air, and including a first lambda probe located in the path for sensing the oxygen concentration in the exhaust gas and for issuing a signal indicative of such concentration, and a control device responsive to the probe signal for controlling engine operation by controlling the ratio of the air/fuel mixture fed to the engine.

The improvement comprises a second said probe located in the path at a point spaced therealong from the first probe, the second probe and control device being arranged such that the control device is also responsive to the signal from the second probe for detecting deviation of the signal from one probe from that from the other probe for effecting a comparison measurement of the signals from the two probes during reduced pressure phases of engine operation and for generating an error signal solely when such deviation arises on the basis of an increase in oxygen concentration during such reduced pressure phases, said increase being indicative of external air suction leakage into the path.

The control device may have visual indication means actuated by the error signal for generating an ongoing visual error indication which is continuously maintained following such actuation even in the absence of a continued error signal.

In particular, the path extends from an upstream portion to a downstream portion thereof, the engine has exhaust valve means leading to the upstream portion of the path, a three way catalytic converter is disposed operatively in the downstream portion of the path, one probe is located in the path immediately after the exhaust valve means and the other probe is located in the path immediately before the three way catalytic converter.

One form of the invention concerns a monitoring apparatus for monitoring a ratio of an air/fuel mixture, comprising an internal combustion engine having an exhaust gas path and being arranged to intercept the air/fuel mixture fed to an operating engine, including intermittent reduced pressure phases of engine running in which the path undergoes periods of reduced pressure relative to the atmospheric pressure of external air, and monitoring means for detecting external air suction leakage into the path. The monitoring means include first and second sensing and signaling probes arranged at corresponding first and second points spaced from each other along the path for sensing the oxygen concentration in the exhaust gas thereat and for issuing a signal indicative of such oxygen concentration, and control means.

The control means are responsive to the signals from the probes for controlling the engine operation by controlling the ratio of the air/fuel mixture fed to the engine and for detecting deviation of the signal from one probe from that from the other probe for effecting a comparison measurement of the signals from the two probes during reduced pressure phases of engine running and for generating an error signal solely when such deviation arises on the basis of an increase in oxygen concentration during such reduced pressure phases, the increase being indicative of external air suction leakage into the exhaust gas path. Desirably, one probe is at a first point in an upstream portion of the path adjacent the engine and the other probe is at a second point in a downstream portion of the path remote from the engine for detecting external air suction leakage into the path between the points.

More particularly, the invention concerns a monitoring apparatus for monitoring a ratio of air/fuel mixture, comprising an internal combustion engine having an exhaust gas path extending from an upstream portion to a downstream portion thereof, engine exhaust valve means leading to the upstream portion of the path and a three way catalytic converter disposed operatively in the downstream portion of the path, the engine being arranged to intercept the air/fuel mixture fed to the operating engine including intermittent reduced pressure phases of engine operation in which the path undergoes periods of reduced pressure relative to the atmospheric pressure of external air, and monitoring means for detecting external air suction leakage into the path.

The monitoring means include a first sensing and signaling probe in the path immediately after the exhaust valve means and a second sensing and signaling probe in the path immediately before the three way catalytic converter, each probe being arranged for sensing the oxygen concentration in the exhaust gas thereat and for issuing a signal indicative of such oxygen concentration, and control means as aforesaid.

BRIEF DESCRIPTION OF THE DRAWING

Other objects of the invention will become apparent from the within specification and accompanying drawings, in which:

the figure is a schematic partial sectional side view of an internal combustion engine provided with an exhaust gas monitoring arrangement according to the invention.

DESCRIPTION OF THE PREFERRED EMBODIMENTS

Referring to the drawing, a conventional internal combustion engine 1 is shown having a monitoring arrangement according to an embodiment of the invention for monitoring suction leakage of external air into its exhaust gas line.

Engine 1 has at least one cylinder 2 containing a combustion chamber 3 which is provided with an associated intake valve 4 connected to an upstream mixture forming unit 5 such as a carburetor for forming an air/fuel mixture feed of selective ratio, and an associated exhaust valve 6 connected to an exhaust pipe defining an exhaust gas path 7 in which a conventional three way catalytic converter 8 is operatively disposed. Although engine 1 may contain only one cylinder, it normally contemplates a construction with several cylinders as in an automobile engine.

In accordance with the invention, two conventional lambda probes 9 and 10 are arranged within path 7 in spaced apart relation. Probes 9 and 10 serve indirectly to control the ratio of the air/fuel mixture formed in unit 5 and fed to a given cylinder 2, by sensing the oxygen concentration in the exhaust gas in path 7. This makes it possible to control by feedback technique in conventional manner the operation of the engine for achieving as far as possible stoichiometric combustion of the air/fuel mixture in the given combustion chamber 3.

Although the distance separating probes 9 and 10 is only shown schematically, in practice lambda probe 9 is desirably arranged in path 7 as close as possible to, i.e. just after, the given exhaust valve 6, and lambda probe 10 is desirably arranged in path 7 as close as possible to, i.e. just before, the three way catalytic converter 8, in order to monitor to the maximum the entire distance of the exhaust gas path 7 that is potentially subject to suction leakage of external air thereinto.

The output signals U lambda 1 and U lambda 2 from probes 9 and 10 are fed to a control device 11 provided with a visual fault indicator 12. Control device 11 is normally present in the arrangement for sensing and evaluating various engine characteristics to control or regulate the engine operation in known manner, not forming a part of the invention improvement.

However, within control device 11, the signals from probes 9 and 10 are compared with one another, according to the invention, by forming their difference, i.e. by determining the value difference between the individual value of one signal from probe 9 and the individual value of the other signal from probe 10. Deviations of the signals from the two probes 9 and 10 provide an indication, according to the invention, of suction air leakage into exhaust gas path 7.

Such leakage is particularly evident in reduced pressure phases of engine (motor) running, because high oxygen content exterior air can enter into exhaust path 7 as a result of pulsations consequent intermittent engine operation. Upon the occurrence of a significant deviation, an error or alarm signal is emitted by control device 11 which actuates a visual indication by fault indicator 12 signifying a leakage for diagnostic purposes and indicating the need for corrective servicing of the engine. Desirably, control device 11 is arranged such that the error signal visually indicated by fault indicator 12 is an ongoing visual error indication which cannot be extinguished by the engine operator, i.e. vehicle driver, and which is continuously maintained following error signal actuation, even in the absence of a continued error signal, i.e. until corrective engine servicing and authorized resetting of fault indicator 12.

It is to be understood that intermittent reduced pressure phases of the engine operation occur as a result of given operating conditions, such that path 7 undergoes periods of reduced pressure relative to the atmospheric pressure of external air. During such reduced pressure phases of engine operation probes 9 and 10 sense the oxygen concentration in the exhaust gas at respective upstream and downstream points, correspondingly immediately after a given exhaust valve 6 and immediately before three way catalytic converter 8, for issuing respective signals indicative of the oxygen concentration at such two spaced apart points.

These signals are normally used by control device 11 for controlling the engine operation for desired stoichiometric combustion by controlling the ratio of the air/fuel mixture formed in unit 5. However, upon detection of a deviation by control device 11 of the signal from probe 9 relative to the signal from probe 10, which upon comparison measurement indicates an increase in oxygen concentration solely during such a reduced pressure phase operation, control device 11 generates an error signal via fault indicator 12. This increase in oxygen concentration signifies suction leakage introduction of atmospheric pressure external air into path 7.

Control device 11 is programmed in conventional manner for operation to achieve the above described conventional functions and the monitoring function per the invention.

The oxygen concentration monitoring effected according to the invention provides the advantage of detecting sealing failures in the section of the engine exhaust gas path between the associated engine exhaust valve and the three way catalytic converter as demarcated by the spaced apart locations of the two lambda probes in the path. This exhaust gas path section is becoming increasingly fitted with a number of complex and failure-prone devices, e.g. secondary air pumps, decoupling elements, pulse air devices, etc., thus increasing the number of potential sealing failure sites and consequent instances of suction leakage of external air into the exhaust gas path.

The specification and drawings are for illustration and not limitation, and may be modified without departing from the invention which is limited solely by the scope of the claims.

What is claimed is:

1. A monitoring apparatus for an internal combustion engine having an exhaust gas path and arranged to intercept a air/fuel mixture fed to the engine while operating, including intermittent reduced pressure phases of engine operation in which the exhaust gas path undergoes periods of reduced pressure relative to the atmospheric pressure of external air, and including a first lambda probe located in the exhaust gas path for sensing an oxygen concentration in the exhaust gas and for issuing a first signal indicative of the oxygen concentration, and a control device responsive to the first signal from the first lambda probe for controlling engine operation by controlling the ratio of the air/fuel mixture fed to the engine, the improvement comprising:

a second lambda probe for sensing the oxygen concentration in the exhaust gas and for issuing a second signal indicative of the oxygen concentration, said second lambda probe being located in the exhaust gas path at a point spaced therealong from the first lambda probe, said control device being arranged such that it is also responsive to said second signal from said second probe, said control device including means for detecting a deviation of the first signal from the first lambda probe from that of said second signal from said second lambda probe by effecting a comparison measurement of the first signal and said second signal from said first and second lambda probes, respectively, during reduced pressure phases in the engine operation and means for generating an error signal when said deviation arises on the basis of an increase in the oxygen concentration during said reduced pressure phases, said increase in oxygen concentration being indicative of external air suction leakage into the exhaust gas path.

2. The apparatus of claim 1, wherein the control device is further provided with indication means actuated by said error signal for generating an ongoing error indication which is continuously maintained following said actuation even in the absence of a continued error signal.

3. The apparatus of claim 1, wherein the exhaust gas path extends from an upstream portion to a downstream portion thereof, the engine has exhaust valve means leading to said upstream portion of the path, a three way catalytic converter being disposed operatively in said downstream portion of the path, the first lambda probe is located in the path immediately after said exhaust valve means and said second lambda probe being located in the path immediately before said three way catalytic converter.

4. A monitoring apparatus, comprising:

an internal combustion engine having an exhaust gas path and arranged for intercepting a air/fuel mixture fed to the engine, while operating, including intermittent reduced pressure phases of engine operation in which said path undergoes periods of reduced pressure relative to the atmospheric pressure of external air;

monitoring means for detecting external air suction leakage into said path, including first and second sensing and signaling probes for providing first and second signals, respectively, said first and second probes arranged at corresponding first and second points, respectively, spaced from each other along said path for sensing an oxygen concentration in said exhaust gas at each probe and for issuing said signals indicative of said oxygen concentrations; and control means responsive to said signals from said first and second probes for controlling engine operation by controlling the ratio of the air/fuel mixture fed to the engine, said control means including means for detecting a deviation of the signal from said first probe from that of the signal from said second probe by effecting a comparison measurement of said signals from said first and second probes during reduced pressure phases of engine operation and means for generating an error signal when said deviation arises on the basis of an increase in said oxygen concentration during said reduced pressure phases, said increase in oxygen concentration being indicative of external air suction leakage into said exhaust gas path.

5. The apparatus of claim 4, wherein said first sensing and signaling probe is at a first point in an upstream portion of said path adjacent said engine and said second probe is at a second point in a downstream portion of said path remote from said engine for detecting external air suction leakage into said path between said first and second points.

6. A monitoring apparatus, comprising:

an internal combustion engine having an air/fuel mixture fed thereto and an exhaust gas path extending from the engine from an upstream portion to a downstream portion thereof;

engine exhaust valve means leading to said upstream portion of said path;

a three way catalytic converter disposed operatively in said downstream portion of said path and said path being arranged for intercepting the air/fuel mixture fed from the engine while operating, including intermittent reduced pressure phases of engine operation in which said path undergoes periods of reduced pressure relative to the atmospheric pressure of external air;

monitoring means for detecting external air suction leakage into said path, including a first sensing and signaling probe in said path immediately after said exhaust valve means and a second sensing and signaling probe in said path immediately before said three way catalytic converter, each of said first and second probes being arranged for sensing an oxygen concentration in said exhaust gas at each probe and for issuing first and second, respective, signals indicative of said oxygen concentrations; and control means responsive to said first and second signals from said first and second probes for controlling engine operation by controlling said ratio of said air/fuel mixture fed to said engine, said control means including means for detecting a deviation of said first signal from said first probe from that of said second signal from said second probe by effecting a comparison measurement of said first and second signals from said first and second probes during reduced pressure phases of engine operation and means for generating an error signal when said deviation arises on the basis of an increase in said oxygen concentration during said reduced pressure phases, said increase in said oxygen concentration being indicative of external air suction leakage into said exhaust gas path.

* * * * *